(12) United States Patent
Symes et al.

(10) Patent No.: US 12,271,608 B2
(45) Date of Patent: Apr. 8, 2025

(54) DATA ACCUMULATION

(71) Applicant: Arm Limited, Cambridge (GB)

(72) Inventors: Dominic Hugo Symes, Cambridgeshire (GB); John Wakefield Brothers, III, Calistoga, CA (US); Jens Olson, San Jose, CA (US); Peter Mattias Hansson, Skåne (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/099,627

(22) Filed: Jan. 20, 2023

(65) Prior Publication Data

US 2024/0248621 A1 Jul. 25, 2024

(51) Int. Cl.
G06F 3/06 (2006.01)
G06F 7/52 (2006.01)

(52) U.S. Cl.
CPC .......... G06F 3/0626 (2013.01); G06F 3/0644 (2013.01); G06F 3/0673 (2013.01); G06F 7/52 (2013.01)

(58) Field of Classification Search
CPC .... G06F 3/0626; G06F 3/0644; G06F 3/0673; G06F 7/52
USPC ....................................................... 711/154
See application file for complete search history.

(56) References Cited

U.S. PATENT DOCUMENTS

| 2002/0040379 | A1  | 4/2002 | Amer |
| 2021/0303307 | A1* | 9/2021 | Olson .................. G06F 7/5443 |
| 2023/0025068 | A1* | 1/2023 | Badaroglu ............. G06N 3/048 |

OTHER PUBLICATIONS

UKIPO Search Report dated Sep. 4, 2024 for GB Application No. GB2400297.4.

* cited by examiner

*Primary Examiner* — Gautam Sain
(74) *Attorney, Agent, or Firm* — EIP US LLP (57) ABSTRACT

A processor to generate accumulated data comprising, for an operation cycle: performing an operation on a first bit range of a set of first input data to generate a set of operation data, which is accumulated with stored data within a first storage device. A lowest n bits of the accumulated data are accumulated with first further stored data within a first bit range of a second storage device, and are bit-shifted from the first storage device. Further accumulated data is generated, comprising, for an operation cycle: performing the operation on a second bit range of the set of first input data to generate a further set of operation data, which is accumulated with the stored data within the first storage device. A lowest m bits of the further accumulated data is accumulated with second further stored data within a second bit range of the second storage device.

20 Claims, 6 Drawing Sheets

DATA ACCUMULATION

BACKGROUND

Technical Field

The present invention relates to processors, methods and non-transitory computer-readable storage media for accumulation of data.

Description of the Related Technology

As computing technologies advance and use of data-intensive processing techniques, such as those involving the use of neural networks, becomes more intensive, the importance of managing the resources relied upon to implement such techniques takes on greater importance. These techniques often involve the performance of many operations, such as the repeated application of the same operation to different input data. For example, in the context of neural networks, particularly those having several layers of nodes, many accumulations are performed in order to implement the neural network and generate outputs from input data. A processing system may be used to perform large volumes of successive operations, and subsequently store the results of those operations. It is desirable to efficiently accumulate and store data generated in such scenarios.

SUMMARY

According to a first aspect of the present invention, there is provided a processor to: obtain at least one set of first input data; divide each of the at least one set of first input data into at least a first bit range and a second bit range, higher than the first bit range; generate accumulated data, wherein to generate the accumulated data comprises, for each operation cycle of at least one operation cycle: performing an operation on the first bit range of a respective set of the at least one set of first input data to generate a set of operation data; and accumulating the set of operation data with stored data within a first storage device; accumulate a lowest n bits of the accumulated data with first further stored data within a first bit range of a second storage device; bit-shift the lowest n bits of the accumulated data from the first storage device, thereby updating the stored data within the first storage device; generate further accumulated data, wherein to generate the further accumulated data comprises, for each operation cycle of a further at least one operation cycle after the at least one operation cycle: performing the operation on the second bit range of a respective set of the at least one set of first input data to generate a further set of operation data; and accumulating the further set of operation data with the stored data within the first storage device; and accumulate a lowest m bits of the further accumulated data with second further stored data within a second bit range of the second storage device, higher than the first bit range of the second storage device.

According to a second aspect of the present invention, there is provided a method comprising: obtaining at least one set of first input data; dividing each of the at least one set of first input data into at least a first bit range and a second bit range, higher than the first bit range; generating accumulated data, wherein the generating the accumulated data comprises, for each operation cycle of at least one operation cycle: performing an operation on the first bit range of a respective set of the at least one set of first input data to generate a set of operation data; and accumulating the set of operation data with stored data within a first storage device; accumulating a lowest n bits of the accumulated data with first further stored data within a first bit range of a second storage device; bit-shifting the lowest n bits of the accumulated data from the first storage device, thereby updating the stored data within the first storage device; generating further accumulated data, wherein the generating the further accumulated data comprises, for each operation cycle of a further at least one operation cycle after the at least one operation cycle: performing an operation on the second bit range of a respective set of the at least one set of first input data to generate a further set of operation data; and accumulating the further set of operation data with the stored data within the first storage device; and accumulating a lowest m bits of the further accumulated data with second further stored data within a second bit range of the second storage device, higher than the first bit range of the second storage device.

According to a third aspect of the present invention, there is provided anon-transitory computer-readable storage medium comprising a set of computer-readable instructions stored thereon which, when executed by at least one processor, are arranged to cause the at least one processor to: obtain at least one set of first input data; divide each of the at least one set of first input data into at least a first bit range and a second bit range, higher than the first bit range; generate accumulated data, wherein to generate the accumulated data comprises, for each operation cycle of at least one operation cycle: performing an operation on the first bit range of a respective set of the at least one set of first input data to generate a set of operation data; and accumulating the set of operation data with stored data within a first storage device; accumulate a lowest n bits of the accumulated data with first further stored data within a first bit range of a second storage device; bit-shift the lowest n bits of the accumulated data from the first storage device, thereby updating the stored data within the first storage device; generate further accumulated data, wherein to generate the further accumulated data comprises, for each operation cycle of a further at least one operation cycle after the at least one operation cycle: performing the operation on the second bit range of a respective set of the at least one set of first input data to generate a further set of operation data; and accumulating the further set of operation data with the stored data within the first storage device; and accumulate a lowest m bits of the further accumulated data with second further stored data within a second bit range of the second storage device, higher than the first bit range of the second storage device.

BRIEF DESCRIPTION OF THE DRAWINGS

Further features will become apparent from the following description of examples, which is made with reference to the accompanying drawings.

DETAILED DESCRIPTION

Certain data processing techniques involve the accumulation of a large amount of data. For example, certain machine learning tasks, such as neural processing tasks, involve the convolution of 16-bit tensor data, e.g. representing a multi-dimensional tensor representing an input feature map, with weight data. For weight data of 8 bits (or higher), this convolution will generate an output which is longer than 32 bits. To accommodate such a large output, a storage device with more than 32 bits, such as a 40-bit or a 48-bit storage device, could be used. However, reading data from such a large storage device requires a relatively high data bandwidth. The data bandwidth may limit the maximum rate of accumulation.

Examples herein may reduce the data bandwidth for processing and storage of large data such as this, which can improve data processing performance. For example, according to a first aspect there is a provided a processor to generate accumulated data for accumulation within a first storage device. A second storage device is then updated using the accumulated data. The accumulated data is accumulated at the first storage device over at least one operation cycle (and, in some cases, a plurality of operation cycles, to improve efficiency and reduce bandwidth for sending data to the second storage device). The generation of the accumulated data involves, for each operation cycle, performing an operation on a first bit range of a set of first input data to generate a set of operation data, and accumulating the set of operation data with stored data within the first storage device. The updating of the second storage device using the accumulated data involves accumulating a lowest n bits of the accumulated data with first further stored data within a first bit range of the second storage device. The lowest n bits of the accumulated data, which are now stored in the second storage device for further accumulation, are bit-shifted from the first storage device. In this way, higher bits that were in the first storage device prior to the bit-shift remain in the first storage device, in a bit-shifted down form, for further operations. The processor then generates further accumulated data in a similar manner to the generation of the accumulated data, by performing, for each operation cycle of a further at least one operation cycle after the at least one operation cycle, the operation on a second bit range of the set of first input data to generate a further set of operation data, which is accumulated with the stored data within the first storage device. The lowest m bits of the further accumulated data (where m may be the same as or different from n) are then accumulated with second further stored data within a second bit range of the second storage device. The second bit ranges of the first and second storage devices are higher than the first bit ranges of the first and second storage devices, respectively, where a higher bit range refers to a higher order (e.g. more significant) bit range.

With this approach, the processing to be performed is for example broken down into a series of smaller processing actions, each applied to a different bit range of the input data to be processed. This for example allows different bit ranges to be processed separately, and transferred independently to the second storage device, e.g. at different times. This for example allows a smaller storage to be used as the first storage device and can reduce the bandwidth for transfer of data to the second storage device by transferring the data in portions rather than all at once. In this way, the storage footprint for performing the accumulation can be reduced. Furthermore, the first and second bit ranges of the second storage device can be accessed independently, e.g. by being read from or written to at different times from each other. This can further reduce bandwidth for interacting with the second storage device.

In some examples, the first input data is divided into solely the first bit range and the second bit range, so that the first and second bit ranges together represent the entirety of the first input data. However, in other examples, the first input data may be divided into more than two bit ranges, which may allow larger accumulations to be performed without utilizing larger first and second storage devices and/or a higher bandwidth. In such cases, accumulated data may be generated separately for each of the bit ranges of the first input data in turn, with a lowest n bits of accumulated data for each of the bit ranges accumulated within a respective bit range of the second storage device, and the lowest n bits bit-shifted out of the first storage device before generating the accumulated data for the next of the bit ranges of the first input data. It is to be appreciated that the lowest n bits of accumulated data that are accumulated with a respective bit range of the second storage device may be the same n bits (i.e. the same number of lowest bits) or different for each of the bit ranges of the first input data.

The lowest n bits of the accumulated data within the first storage device that are accumulated with the first further stored data are for example less than all of the accumulated data. This for example reduces the risk of causing an overflow of the first bit range of the second storage device, which may occur if the value obtained by accumulating the accumulated data with the first further stored data has a bit size which exceeds the size of the first bit range. Bit-shifting the lowest n bits of the accumulated data from the first storage device allows the further set(s) of operation data to be accumulated at the right position. For example, if n is 8 and the second bit range starts at bit 8 of the second storage device, the further set(s) of operation data are effectively added on to bits 8 onwards of a final result once they are accumulated with the second further stored data within the second bit range of the second storage device.

In some examples, there are a plurality of sets of first input data, a plurality of operation cycles over which the accumulated data is generated, and a further plurality of operation cycles over which the further accumulated data is generated. In these examples, to generate the accumulated data comprises, for each operation cycle of the plurality of operation cycles: performing an operation on the first bit range of a respective set of the plurality of sets of first input data to generate a set of operation data; and accumulating the set of operation data with stored data within a first storage device; and to generate the further accumulated data comprises, for each operation cycle of the further plurality of operation cycles: performing the operation on the second bit range of a respective set of the plurality of sets of first input data to generate a further set of operation data; and accumulating the further set of operation data with the stored data within the first storage device. In these cases, the operation may thus be performed on the first bit range of a different set of the first input data for each operation cycle. In other words, the number of operation cycles over which the accumulated data is generated may be the same as the number of sets of first input data, with each set of the first input data processed during a different respective operation cycle. The further accumulated data may be generated similarly in these cases, by performing the operation on the second bit range of a different set of the first input data for each operation cycle of the further operation cycles (which are after the operation cycles to generate the accumulated data). In such cases, the number of further operation cycles over which the further accumulated data is generated may also be the same as the number of sets of first input data to be processed. This allows accumulations to be performed for a plurality of sets of first input data before subsequently updating the second storage device, so that data is accumulated at the second storage device less frequently than at the first storage device. This is for example more efficient than updating the second storage device at the same rate as the first storage device, and for example reduces bandwidth in updating of the second storage device. For example, power consumption can be reduced by reducing the frequency of access to the second storage device in this manner, particularly in cases in which access to the second storage device is more intensive than access to the first storage device (which may be the case in some examples).

In some examples, the performing the operation on the first bit range of the respective set of the at least one set of first input data, for each operation cycle of the at least one operation cycle, comprises, for each operation cycle of the at least one operation cycle: multiplying the first bit range of the respective set of the at least one set of first input data with a bit range of a respective set of at least one set of second input data to generate the set of operation data; and the performing the operation on the second bit range of the respective set of the at least one set of first input data, for each operation cycle of the further at least one operation cycle, comprises, for each operation cycle of the further at least one operation cycle: multiplying the second bit range of the respective set of the at least one set of first input data with the bit range or a further bit range of a respective set of the at least one set of second input data to generate the further set of operation data. In this way, multiplication and accumulation operations can for example be performed efficiently, with reduced bandwidth than otherwise.

In some of these examples, to accumulate the lowest n bits of the accumulated data with the first further stored data generates a carry represented by carry data, and, to accumulate the lowest m bits of the further accumulated data with the second further stored data comprises accumulating the lowest m bits of the further accumulated data with the second further stored data and the carry data within the second bit range of the second storage device. This for example allows the approaches herein to accommodate operations that generate data with a size that exceeds a size of the first bit range of the second storage device without losing data or requiring a larger first bit range for the second storage device.

In some of these examples, each of the at least one set of first input data comprises a respective set of neural network weight data and each of the at least one set of second input data comprises a respective set of tensor data representative of at least a part of a multi-dimensional tensor, which in examples herein is an activation tensor. An activation tensor is for example a tensor containing values that indicate how active features are based on an input. A weight tensor (e.g. represented by neural network weight data) for example includes a set of weights to apply to the activations represented by an activation tensor to extract features (and so generate new activation tensors). In examples such as this, neural network processing involving the processing of neural network weight data with tensor data can for example be performed in an efficient and lower bandwidth manner than otherwise.

In some examples, after accumulation of the lowest m bits of the further accumulated data with the second further stored data, a bit range of the second storage device stores first value data representing a first portion of a value and a further bit range of the second storage device, higher than the bit range used to store the first value data, stores second value data representing a second portion of the value. These examples for example allow a value to be generated in portions, using a more bandwidth-efficient approach than otherwise.

In some of these examples, the processor is to: read the first value data from the bit range of the second storage device at a first time; read the second value data from the further bit range of the second storage device at a second time, different from the first time; and combine at least the first value data and the second value data to generated value data representative of the value. Reading the first and second value data at different times for example reduces the bandwidth compared to reading the entirety of the second storage device at the same time. In some of these examples, the first value data is comprised by a first word in the bit range of the second storage device and the second value data is comprised by a second word, different from the first word, in the further bit range of the second storage device. The first and second words can for example be read and updated separately, which can reduce bandwidth by allowing the first value data and the second value data to be read and written to the first and second words at different times compared to other approaches in which an entirety of a second storage device is read from or written to in one go.

In these examples, the bit range may comprise the first bit range and the further bit range may comprise the second bit range, although this need not be the case in some examples. For example, data may be accumulated more than two times at the second storage device, each with a different respective bit range of the second storage device (i.e. so that the second storage device includes more than two bit ranges). In such cases, the bit ranges used for reading may differ from those used for accumulation. For example, data may be accumulated within a first bit range of bits 0:7 of a first word of 32 bits of the second storage device, then within a second bit range of bits 8:15 of the first word of the second storage device and finally within a third bit range of bits 0:31 of a second word of 32 bits of the second storage device (representing a higher, i.e. more significant, half of the second storage device than the first word and corresponding to bits 16:47 of the value). In such cases, the first value data may be stored in bits 0:15 of the first word (read at a first time) and the second value data may be stored in bits 0:31 of the second word (read at a second time), so as to read the low and high halves of the second storage device at different times from each other. In other words, in this case, the bit range is 0:15 of the first word of the second storage device (storing the first value data) and the further bit range is 0:31 of the second word of the second storage device (storing the second value data), whereas the first bit range is 0:7 of the first word, the second bit range is 8:15 of the first word and the third bit range is 0:31 of the second word. In this example, the second storage device can store up to 64 bits in total, and up to 32 bits of data bandwidth is needed to read each of the first and second value data (from the first and second words, respectively, which are each of 32 bits). In contrast, reading the second storage device in its entirety would require up to 64 bits of data bandwidth.

In some examples, accumulating the set of operation data with the stored data within the first storage device comprises accumulating the set of operation data with the stored data within a first series of bits of the first storage device; and the accumulating the further set of operation data with the stored data within the first storage device comprises accumulating the further set of operation data with the stored data within a second series of bits of the first storage device, the second series of bits comprising, and being larger than, the first series of bits. In this way, the first storage device can for example be used flexibly for different stages of processing (corresponding to performing the operation on different bit ranges of the first input data). For example, prior to the accumulation of operation data at the first storage device, to generate the accumulated data, the first storage device may be empty, or may store a null value, e.g. representing zero. However, as the first storage device may continue to store data after the lowest n bits of the accumulated data are bit-shifted out, accumulating the further set(s) of operation data with stored data within the first storage device may result in the generation of further accumulated data with a larger size than the accumulated data. Using a second series of bits of the first storage device to store the further accumulated data, which is larger than a first series of bits of the first storage device to store the accumulated data, for example allows the further accumulated data to be stored within the first storage device without having to discard a portion of the further accumulated data or perform an additional accumulation of the further accumulated data at the second storage device. Thus, accuracy can for example be maintained without increasing bandwidth.

In some examples, the first storage device is a first accumulator and the second storage device is a second accumulator. Accumulators are for example registers for storing intermediate data generated during the performance of particular processing functionality. Accumulators can for example be accessed more rapidly than main memory, so accumulating data within first and second accumulators for example allows the accumulation process to be performed more rapidly than otherwise.

In some examples, the first storage device has a higher bandwidth than the second storage device. For example, the first storage device may be implemented by a flip-flop or other storage device that can be accessed relatively rapidly and with relatively low power consumption. In contrast, the second storage device may be stored within a static random-access memory (SRAM), which may be more area efficient but with lower bandwidth and higher power consumption. To take advantage of the differing characteristics of the first and second storage devices, examples herein may involve accumulations over a plurality of operation cycles within the first storage device, before then accumulating data with the second storage device. For example, the accumulated data and the further accumulated data may each be generated over P operation cycles, with the P operation cycles for generating the further accumulated data occurring subsequently to the P operation cycles for generating the accumulated data. In such cases, accumulation of data at the second storage device may occur once every P operation cycles, rather than each operation cycle.

In some examples, the processor is to: store the accumulated data in a further first storage device; and, to accumulate the lowest n bits of the accumulated data with the first further stored data, send the lowest n bits of the accumulated data from the further first storage device to the second storage device for accumulation with the first further stored data within the first bit range of a second storage device. In some of these examples, the processor is to: store the further accumulated data in the further first storage device; and, to accumulate the lowest m bits of the further accumulated data with the second further stored data, send the lowest m bits of the further accumulated data from the further first storage device to the second storage device for accumulation with the second further stored data within the second bit range of a second storage device. The further first storage device and the first storage device for example improve efficiency, as one of these devices can be used to accumulate data (such as the accumulated data and/or the further accumulated data) while the other is being read to add data into the second storage device. However, it is to be appreciated that, in other cases, there may be a single first storage device without a further first storage device.

In some examples, m is greater than n. In other words, a larger bit range of the further accumulated data (represented by the value m) is accumulated within the second, higher, bit range of the second storage device than the bit range of the accumulated data (represented by the value n) that is accumulated within the first bit range of the second storage device. For example, m may correspond to the size of the first storage device, for example to transfer all the data stored within the first storage device, e.g. at the final stage of a particular calculation that has been divided into sub-calculations performed on a per-bit-range basis. The second bit range of the second storage device may correspondingly be larger than the first bit range of the second storage device so as to accommodate a larger input value without an overflow occurring.

As explained above, second and third aspects of the present invention relate to a method and a non-transitory computer-readable storage medium as set out in the summary section. Any examples in accordance with the first aspect may equally be applied to the second and third aspects.

Figure 1:
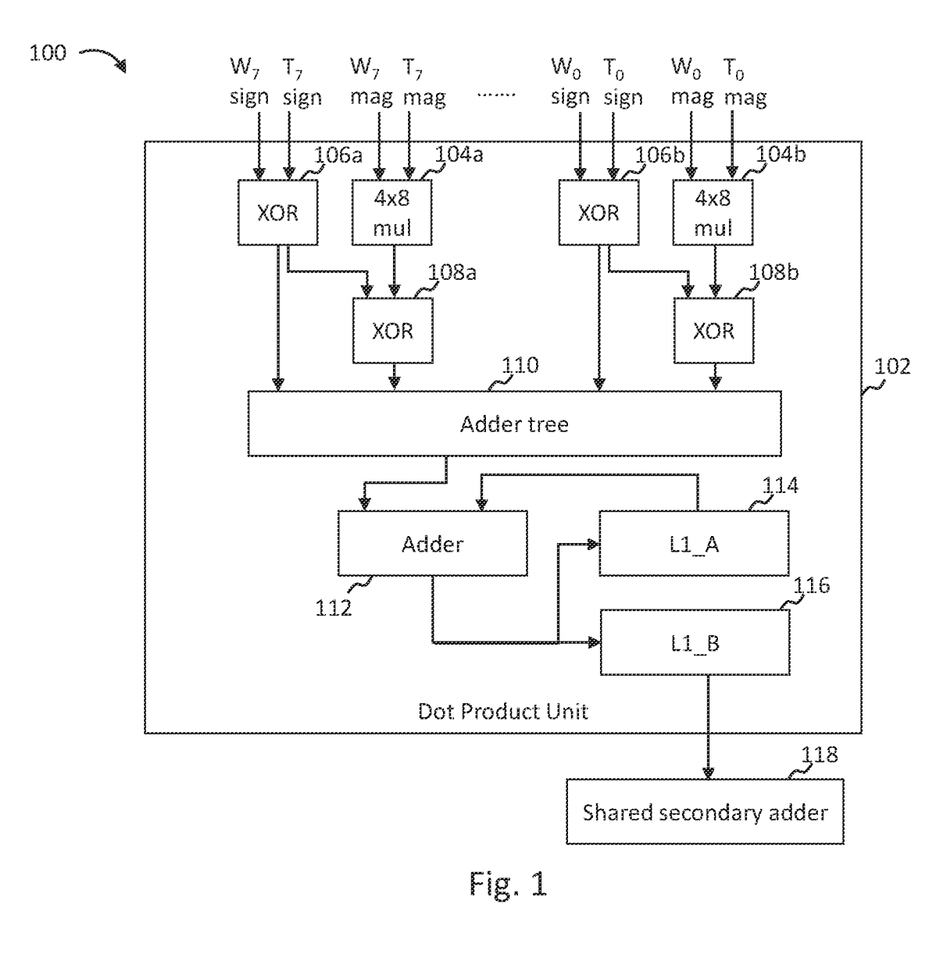
FIG. 1 is a schematic diagram of a processor according to examples.

FIG. 1 is a schematic diagram of a processor 100 according to examples. The processor 100 includes a dot product unit (DPU) 102, which is arranged to perform multiply and accumulate operations to implement a convolution between sets of first and second input data, by calculating a dot product between the sets of first and second input data. In this example, each set of first input data is a set of neural network weight data (which may be referred to as weight data) and each set of second input data is a set of tensor data representative of a tensor. As used herein, the term "tensor" is to be considered to refer to a multi-dimensional tensor. A tensor is an array of elements, such as an array of same-typed scalar elements. The DPU 102 is arranged to convolve eight sets of weight data $W_0$ to $W_7$ (of which $W_0$ and $W_7$ are shown in FIG. 1) with eight corresponding sets of tensor data $T_0$ to $T_7$ (of which $T_0$ and $T_7$ are shown in FIG. 1), each representing a different portion of a tensor, to implement part of a neural network. Neural networks can be used for processes such as machine learning, computer vision, and natural language processing operations. A neural network may operate upon suitable input data (e.g. such as an image or sound data, which may be in the form of a tensor) to ultimately provide a desired output (e.g. an identification of an object within an image, or a spoken word within a sound clip, or other useful output inferred from the input data). This process is usually known as "inferencing" or "classification." In a graphics (image) processing context, neural network processing may also be used for image enhancement ("de-noising"), segmentation, "anti-aliasing." super-sampling, etc., in which case a suitable input image (e.g. represented as a tensor) may be processed to provide a desired output image (which may also be represented as a tensor).

A neural network will typically process the input data according to a network of operators, each operator performing a particular operation. The operations will generally be performed sequentially to produce desired output data (e.g. a classification based on the image or sound data). Each operation may be referred to as a "layer" of neural network processing. Hence, neural network processing may comprise a sequence of "layers" of processing, such that the output from each layer is used as an input to a next layer of processing. Each layer for example processes an input feature map by convolving the input feature map with a set of weights to generate an output feature map, which is used as the input feature map for the next layer. The term "feature map" is used generically herein to refer to either an input feature map or an output feature map. FIG. 1 shows schematically the processing of a particular layer of a neural network according to example, in which each set of tensor data represents a different portion of an input feature map in the form of a tensor and is convolved with a corresponding set of weight data. For example, an output of processing of the entire tensor with corresponding weights for a particular layer of the neural network may correspond to a block of 4096 output elements, e.g. in the form of a 16×8×32 block of an output tensor. In such cases, the tensor to be processed may be divided into so-called microblocks, each corresponding to a portion of the tensor with a size of 2×2×32 or 4×4×8. This is merely illustrative though, and it is to be appreciated that in some cases a tensor may be larger than this, may be divided into larger microblocks and/or may include more dimensions than three.

In one example, there are 128 DPUs (each similar to or the same as the DPU 102 of FIG. 1) arranged to receive 8 inputs, in a 1024 multiply-accumulate (MAC) configuration, so that each output microblock (corresponding to an output of a convolution of an input microblock with corresponding neural network weights) includes 128 output elements, which are for example 2×2×32, 4×4×8, 1×4×32 or 1×16×8 in size. DPUs in this example are grouped into four sets of 32. Each set processes two or eight output feature maps. For 2×2×32 microblocks (of an output feature map), one set processes a 2×2 patch. For example, set 0 processes a 2×2 patch of output elements for output feature maps 0, 4, 8, 12, 16, 20, 24 and 28 and set 1 processes a 2×2 patch of output elements for output feature maps 1, 5, 9, . . . , 29 etc. In this example, DPUs in each set share the same weights, and the same input feature map data (e.g. in the form of tensor data) is provided as an input to all four sets. For example, a 2×2 patch from input feature maps zero to seven is fed into all four sets each operation cycle. Since each set processes a different set of output feature maps, they each have their own sets of weights.

The DPU 102 of FIG. 1 is configured to implement eight 4 bit by 8 bit unsigned multipliers (of which "4×8 mul" multiplier blocks 104a, 104b are shown in FIG. 1) of weight and tensor magnitudes, to multiply 4-bit weights with 8-bit tensors (excluding sign bits, which are handled separately to reduce power consumption and area of the DPU 102). In view of the sign bits, the DPU 102 may thus be considered to implement 5×9 multipliers overall. For example, 8-bit weights and tensor portions may actually be considered to be 9 bits in total: an 8-bit magnitude and a sign bit, and e.g. cover a range of values from −255 to 255. Similarly, 4-bit weights and tensor portions may actually be considered to be 5 bits in total: a 4-bit magnitude and a sign bit, and e.g. cover a range of values from −15 to 15. In other examples, a DPU such as the DPU 102 of FIG. 1 may instead support multipliers of different sizes of input data than 4×8, such as 8-bit weight data x 8-bit tensor data, 8-bit weight data x 16-bit tensor data or 16-bit weight data by 16-bit tensor data. It is to be appreciated that 16-bit weights and tensor portions are 16 bits in total, including the sign bit: a 15-bit magnitude and a sign bit), in a range from $(-2^{15}-1)$ to $(2^{15}-1)$. In other cases, a DPU otherwise similar to the DPU 102 of FIG. 1 may support unsigned 8- and 16-bit tensor data where, in signed magnitude format, the sign bit is set to 0 and the magnitude is in the range from 0 to 255 for 8-bit tensor data and in the range from 0 to 216-1 for 16-bit tensor data.

The multiplier blocks 104a, 104b multiply the magnitudes of respective pairs of weights and tensors. FIG. 1 shows the multiplication of the magnitudes of two weights, $W_0$ mag, $W_7$ mag, with the magnitudes of two tensors, $T_0$ mag, $T_7$ mag, respectively, although it is to be appreciated that the DPU 102 is arranged to process eight weight-tensor pairs, only two of which are shown in FIG. 1. Weight and tensor sign bits are processed using first XOR blocks 106a, 106b to calculate the exclusive or between the weight and tensor sign bits (which takes the value of 0 if the signs are the same and the value of 1 if the signs differ). FIG. 1 shows the XOR of the signs of two weights, $W_0$ sign, $W_7$ sign, with the signs of two tensors, $T_0$ sign, $T_7$ sign, respectively. The resulting bit output from the first XOR blocks 106a, 106b is provided as an input to a respective second XOR block 108a, 108b along with the output from the respective multiplier block 104a, 104b (which is 12 bits in size) to conditionally take the 1's complement. The bit output by each first XOR block 106a, 106b is also fed into an adder tree 110, along with the output from each of the second XOR blocks 108a, 108b (which is also 12 bits in size), for the adder tree 110 to add the 2's complement of negative multiplier outputs. The adder tree 110 in this example is an 8-input adder tree with 8 carry-ins. A further adder 112 is then used to add the output of the adder tree 110 to a first storage device 114 (labelled in FIG. 1 as L1_A) so as to accumulate a set of operation data for an operation (in this case, a multiplication) with stored data stored within the first storage device 114. In this example, after a predetermined number of operation cycles, the accumulated data within the first storage device 114 is also written to a further first storage device 116 (labelled in FIG. 1 as L1_B). The first storage device 114 and the further first storage device 116 in this example are each accumulators, and may each be referred to as a respective primary accumulator, or a respective L1 accumulator.

In FIG. 1, the L1 accumulators have a size of 25 bits, to accommodate accumulation of operation data over up to 32 operation cycles without risking the operation data overflowing from the L1 accumulators. In this case, the L1 accumulators support accumulation for 1 byte of weight and tensor data. When doing 8×16 or 16×16 MACs using a DPU otherwise similar to the DPU 102 of FIG. 1, partial sums for the individual bytes of the weight and tensor data are combined during updating of the secondary storage device. In some cases, if it is determined that the maximum value obtainable by processing particular input data is less than the size of the L1 accumulators, a highest n bits of at least one of the L1 accumulators can be disabled to save power (where the non-disabled, lowest bits of the at least one of the L1 accumulators is at least large enough to store the maximum value obtainable without overflowing).

The DPU 102 is arranged to accumulate data from the further first storage device 116 with stored data stored within a second storage device, in this case via a shared secondary adder 118, which is arranged to receive accumulated data from a plurality of DPUs for adding to the second storage device, in turn. With this approach, the first storage device 114 can be used to accumulate a new set of operation data while the further first storage device 116 is being read to add accumulated data from the further first storage device 116 to the second storage device, via the shared secondary adder 118.

In FIG. 1, the DPU 102 is arranged to multiply different combinations of first and second bit ranges of the weights and tensors separately. A particular combination is multiplied together for each of the eight weight-tensor pairs within an operation cycle to generate a set of operation data (which in this case represents the output of a multiplication operation), which is accumulated with stored data in the first storage device 114. In a subsequent operation cycle, the same combination is multiplied together for each of a different set of eight weight-tensor pairs (representing different input weight and tensor data) to generate a set of operation data for that operation cycle, and is again accumulated with the stored data in the first storage device 114. This continues over a plurality of operation cycles until a predetermined number of different sets of input weight and tensor data have been processed to generate respective set of operation data, and that set of operation data has been accumulated with the stored data in the first storage device 114. The number of operation cycles over which the operation data is accumulated with the stored data in the first storage device 114 for example corresponds to a frequency with which a second storage device (to which data is to be accumulated) can be updated. In one example, the second storage device can be updated at a maximum rate of once every eight operation cycles. In this example, at least eight operation cycles can thus be used to process the same output element to obtain full utilization. So, for 8 bit by 8 bit, 8 bit by 16 bit and 16 bit by 16 bit MACs, 64 or more weights may be applied before accumulating data from the L1 accumulators in the DPU 102 to the secondary storage device. For 4 bit by 8 bit MACs, 128 or more weights may be applied instead. In such cases, a 3×3 weight kernel may be applied to 16 input feature maps between accumulation of data from the L1 accumulators in the DPU 102 to the secondary storage device.

After the predetermined number of different sets of input weight and tensor data have been processed, the data in the first storage device 114 may be considered to be accumulated data, which has been accumulated over a plurality of operation cycles. At this stage, the accumulated data is then stored in the further first storage device 116. Subsequently, a lowest portion of bits (e.g. a lowest n bits) of the accumulated data is sent from the further first storage device 116 to the shared secondary adder 118 for accumulation within a respective bit range of a second storage device (and, in this case, with accumulated data from other DPUs). A lowest portion of bits is bit-shifted from the first storage device 114, and the process continues again in the same way with the next combination of first and second bit ranges, until each combination has been processed. However, for each different combination, the data sent from the further first storage device 116 is accumulated with a different respective bit range of the second storage device, by the shared secondary adder 118.

Figure 2A:
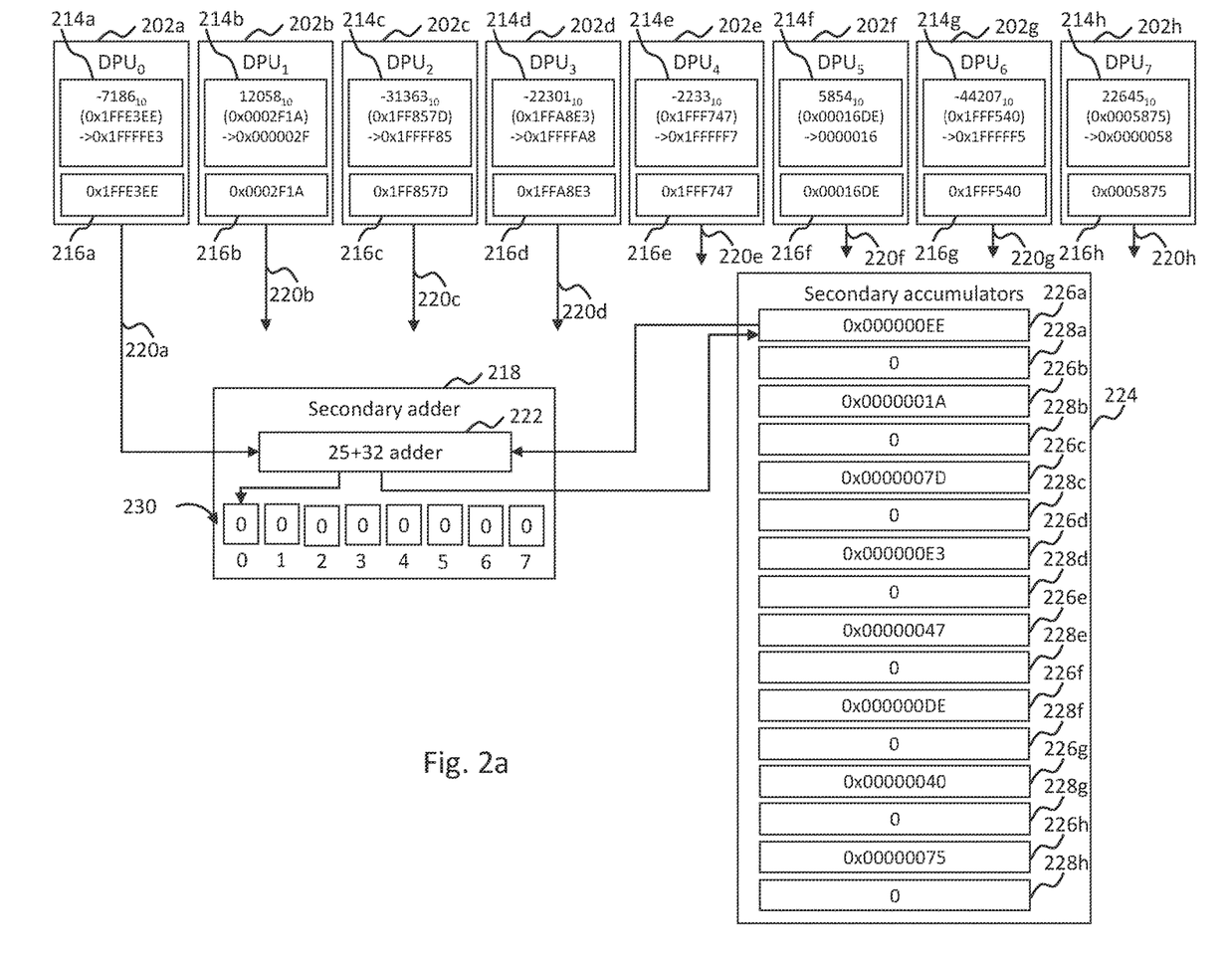
FIGS. 2a, 2b and 2c are schematic diagrams showing accumulation of data according to examples.
Figure 2B:
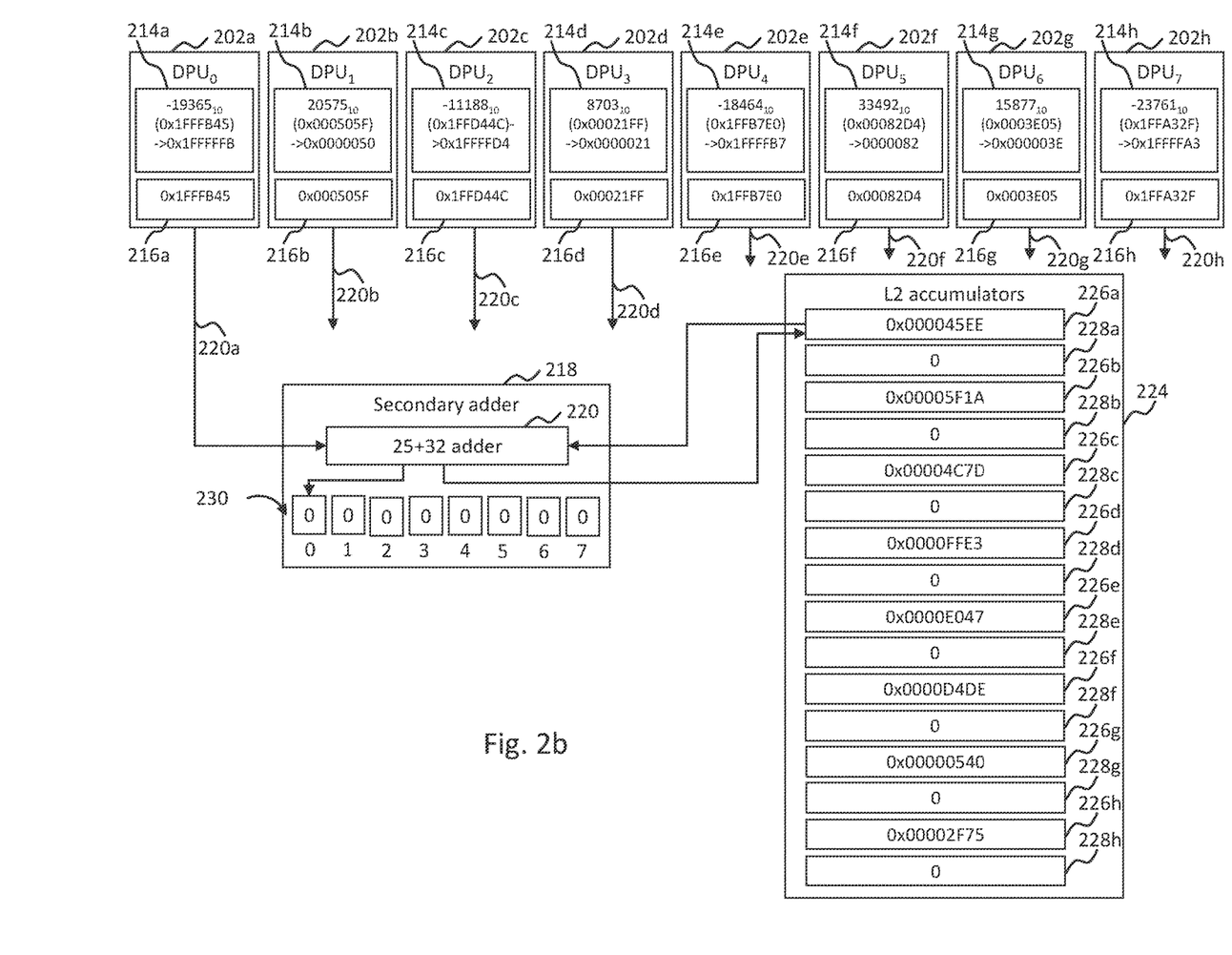
Figure 2C:
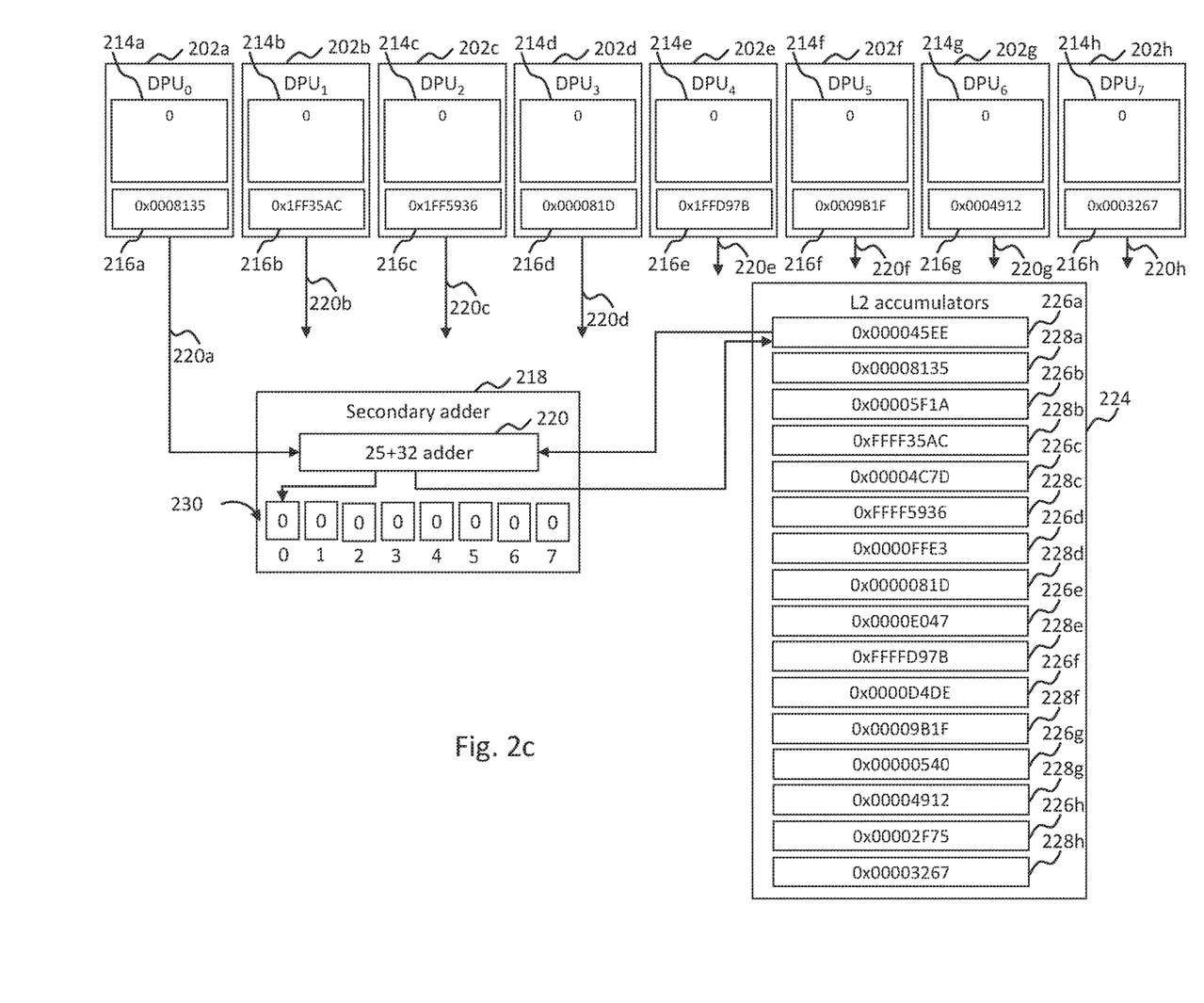

To explain this further, an example accumulation of data using DPUs 202a-202h, which are the same as the DPU 102 of FIG. 1, is shown in FIGS. 2a, 2b and 2c. In this case, the DPUs 202a-202h are used to calculate a convolution (corresponding to a dot product) of 16-bit weights with 16-bit tensors, involving a series of multiply-accumulate operations. The 16-bit by 16-bit dot product is split into four 8-bit by 8-bit dot products: low x low, low x high, high x low, and high x high, which are combined together as described further below to obtain the result of the 16-bit by 16-bit dot product. The low x low dot product is a dot product between a first bit range of weight data and a first bit range of tensor data. The first bit range of the weight data and the tensor data is for example the lowest (e.g. the least significant) x bits of the weight data and the tensor data (where x may differ for the weight data and the tensor data). The low x high dot product is a dot product between the first bit range of the weight data and a second bit range of the tensor data. The second bit range of the tensor data is for example y bits of the tensor data subsequent to (and higher than) the x bits of the tensor data. The high x low dot product is a dot product between a second bit range of the weight data and the first bit range of the tensor data. The second bit range of the weight data is for example y bits of the weight data subsequent to (and higher than) the x bits of the weight data (where y may differ for the weight data and the tensor data). Finally, the high x high dot product is a dot product between the second bit ranges of the weight data and the tensor data. In this case, the weight data and the tensor data are divided into solely two bit ranges: the first and second bit ranges. However, in other cases, data to be processed may be divided into more than two bit ranges.

The DPUs 202a-202h may be included within the same processor or processor system. Each of the DPUs 202a-202h includes a first storage device, labelled 214a-214h for DPUs 202a-202h respectively, and a further first storage device, labelled 216a-216h for DPUs 202a-202h. The first storage devices 214a-214h and the further first storage devices 216a-216h are each 25-bit accumulators in the example of FIG. 2. In this example, the eight DPUs 202a-202h each perform 64 multiply-accumulate operations in eight consecutive operation cycles, from 0-7. In particular, each DPU 202a-202h is arranged to multiply eight input pairs of weight and tensor data (as shown for the DPU 102 of FIG. 1) and to accumulate the output of each of these multiplications in the first storage device 214a-214h and the further first storage device 216a-216h. The combined output of each of these multiplications, accumulated together by the adder tree (shown in FIG. 1) may be considered to correspond to a set of operation data for a particular set of weight data and a corresponding set of tensor data. Hence, each DPU 202a-202h performs eight multiply-accumulate operations per operation cycle. Thus, over eight operation cycles, each DPU 202a-202h performs 64 multiply-accumulate operations in total. The set of operation data for each operation cycle (each corresponding to a different set of weight data and tensor data) is accumulated with stored data stored in the first storage device 214a-214h.

Before operation cycle 0, the first storage device 214a-214h and the further first storage device 216a-216h of each of the DPUs 202a-202h are cleared to zero. FIG. 2a shows the performance of operation cycles 0-7, in which low x low dot products are calculated for a different set of input data per operation cycle and per DPU 202a-202h. For example, a first DPU 202a calculates a multiplication of a first bit range of a set of eight weights and tensors per operation cycle to generate a set of operation data for that operation cycle, which is accumulated with stored data within the first storage device 214a of the first DPU 202a for each operation cycle. Each set of eight weights may be considered to be a set of first input data and each set of eight tensors may be considered to be a set of second input data. At operation cycle 7, each of the first storage devices 214a-214h stores accumulated data, generated by the accumulation of the set of operation data for each of the operation cycles with stored data stored within the respective first storage device. For a particular DPU 202a-202h, the accumulated data of FIG. 2a may be considered to be first accumulated data. The accumulated data for a first storage device 214a-214h of a particular DPU 202a-202h is written to the further first storage device 216a-216h of that DPU 202a-202h. For example, at the end of operation cycle 7, the accumulated data stored in the first DPU 202a has a value of −7186 in decimal (indicated as −718610), which corresponds to a 25-bit value of 0x1FFE3EE in hexadecimal (where the prefix of 0x indicates that this is a hexadecimal number and the most significant bit being set to 1 indicates that the number is negative). The first storage devices 214a-214h then undergo a bit-shift to the right by 8 bits, to bit-shift the lowest 8 bits of the accumulated data from the first storage devices 214a-214h. For the first DPU 202a, this bit-shift is indicated in hexadecimal as (0x1FFE3EE→0x1FFFFE3).

During operation cycles 8 to 15, the lowest 8 bits of the accumulated data within each of the further first storage devices 216a-216h are sent to the secondary adder 218, one DPU 202a-202h per operation cycle. In other words, during operation cycle 8, bits 0:7 of the accumulated data within the further first storage device 216a of the first DPU 202a (corresponding to a hexadecimal value of 0xEE) are sent 220a to the secondary adder 218. Similarly, during operation cycles 9 to 15, bits 0:7 of the accumulated data within the further first storage devices 216b-216h of the second to eighth DPUs 202b-202h (corresponding to hexadecimal values of 0x1A, 0x7D, 0xE3, 0x47, 0xDE, 0x40 and 0x75 respectively) are sent 220b-220h to the secondary adder 218.

The secondary adder 218 includes a 25 bit plus 32 bit adder 222, which adds an incoming 8-bit value to the stored data currently stored in a given bit range of a second storage device. In this example, there are a plurality of second storage devices (referred to in FIG. 2a as secondary accumulators 224), with one per DPU. Each secondary accumulator is divided into two halves, shown separately in FIG. 2a. FIG. 2a thus illustrates eight low portions 226a-226h of the eight secondary accumulators 224 and eight high portions 228a-228h of the eight secondary accumulators 224. Each secondary accumulator is thus made up of a low and a high portion, with the low portions 226a-226h corresponding to the least significant 32 bits of the secondary accumulators 224 (of which the least significant 16 bits of the secondary accumulators 224 are used for accumulation of data from the further first storage devices 216a-216h), and the high portions 228a-228h corresponding to the most significant 32 bits of the secondary accumulators. The low portions 226a-226h may each be considered to correspond to a bit range of a respective second storage device (which is a secondary accumulator in this example). Similarly, the high portions 228a-228h may each be considered to correspond to a further bit range of a respective second storage device, where the bit range and the further bit range of the second storage devices may be read separately. In this example, the low portions 226a-226h are themselves divided into bit ranges (e.g. corresponding to first and second bit ranges), which are updated separately as discussed further with reference to FIG. 2b.

In the example of FIG. 2a (which illustrates the calculation of a low x low dot product), the lowest 8 bits stored within the further first storage device 216a-216h of each DPU 202a-202h is added to first further stored data stored within bits 0:7 (corresponding to a first bit range) of the corresponding secondary accumulator, with this accumulation being performed for a different DPU each operation cycle as explained above. In this case, the first further stored data is zero for each of the secondary accumulators 224, as the secondary accumulators 224 were cleared prior to operation cycle 0. Thus, in operation cycle 8, the value 0xEE corresponding to bits 0:7 of the first DPU 202a is added to the first bit range (bits 0:7 in this case) of the first low portion 226a of the first secondary accumulator, to obtain a value within the first low portion 226a of the first secondary accumulator of 0x000000EE. Bits 0:7 of the second to eighth DPUs 202b-202h are accumulated with the first further stored data in the first bit range (bits 0:7 in this case) of the low portions 226b-226h of the remaining secondary accumulators 224 in ninth to fifteenth operation cycles, respectively. Only the first bit range (bits 0:7) of the low portions 226a-226h of the secondary accumulators 224 are updated at this stage; the remaining portions of each of the secondary accumulators 224 are not updated until later.

Accumulation of the lowest eight bits of the accumulated data of the further first storage device 216a-216h with the corresponding first further stored data in the first bit range of the low portions 226a-226h of the secondary accumulators 224 may result in the generation of a carry (if this accumulation generates a result which is larger than the first bit range, i.e. is larger than 8 bits in this case) represented by carry data. The carry data is stored within a set of carry bits 230 of the secondary adder 218. The set of carry bits 230 includes one carry bit per DPU 202a-202h, labelled from 0 to 7 in FIG. 2a, so that a first carry bit (labelled 0 in FIG. 2a) stores the carry data for the accumulation of the accumulated data from the further first storage device 216a of the first DPU 202a with the first further stored data within the first bit range of the first low portion 226a of the first secondary accumulator, and so forth.

After calculation of the low x low dot product has been performed in this way, as shown in FIG. 2a, the high x low and low x high dot products are calculated in a similar manner but using different bit ranges of the weights and tensors to be processed, as explained above. The calculation of the high x low and low x high dot products is shown schematically in FIG. 2b, which shows the same structural components as FIG. 2a, but for the high x low and low x high dot products rather than the low x low dot product.

In FIG. 2b, during operation cycles 8 to 23, the DPUs 202a-202h perform the high x low and then low x high dot product calculations, described above, so that accumulated data is stored within the first storage devices 214a-214h of each of the DPUs 202a-202h after operation cycle 23. Hence, it can be seen that the high x low and low x high dot product calculations are performed at least partly at the same time as the low x low accumulated data is accumulated within the first bit range of the secondary accumulators (which is performed during operation cycles 8 to 15, as described with reference to FIG. 2a).

In FIG. 2a, the first storage devices 214a-214h were cleared prior to operation cycle zero, so the set of operation data for operation cycle 0 is accumulated with a zero value. However, in FIG. 2b, stored data remains in the first storage devices 214a-214h after the lowest 8 bits of the accumulated data are bit-shifted out of the first storage devices 214a-214h. For example, as shown in FIG. 2a, the first storage device 214a of the first DPU 202a stores stored data representing the value 0x1FFFFE3 after the lowest 8 bits of the accumulated data are bit-shifted out of the first storage device 214a. Hence, in operation cycle 8, a further set of operation data generated for the first DPU 202a by the high x low dot product calculation (i.e. by the multiplication of y bits higher than the lowest x bits of a first set of weights with the lowest x bits of a first set of tensor portions) is accumulated with the stored data representing the value 0x1FFFFE3 rather than by a null value. A similar accumulation is performed in operation cycle 8 for each of the other DPUs 202b-202h, in which the further set of operation data for operation cycle 8 is accumulated with the stored data remaining in the first storage device 214b-214h of that respective DPU 202b-202h, which takes a non-zero value.

In operation cycle 23, the accumulated data for a given DPU 202a-202h is written to the further first storage device 216a-216h for that DPU 202a-202h. The accumulated data in FIG. 2b may be considered further accumulated data (or, alternatively, second accumulated data) to distinguish such data from the (first) accumulated data of FIG. 2a. The lowest 8 bits of the further accumulated data are bit-shifted from the first storage devices 214a-214h so as to update the stored data within the first storage devices 214a-214h. Then, during operation cycles 24 to 31, the lowest 8 bits of each of the further first storage devices 216a-216h are sent 220a-220h to the secondary adder 218, from one DPU 202a-202h per operation cycle. These 8 bits of the further accumulated data are accumulated with second further stored data within a second bit range of the low portion of a respective secondary accumulator 224, which in this case corresponds to bits 8:15 of the low portion of a given secondary accumulator 224. For example, during operation cycle 24, the lowest 8 bits of the further first storage device 216a of the first DPU 202a are accumulated with carry bit 0 of the set of carry bits 230 and the second further stored data in bits 8:15 (corresponding to a second bit range) of the first low portion 226a of the first secondary accumulator. For example, in this case, the lowest 8 bits of the further first storage device 216a of the first DPU 202a are 0x45, which are accumulated with carry bit 0 (which is 0 in this case) and the second further stored data (which is also 0) to update bits 8:15 of the first low portion 226a to 45 (in hexadecimal). Thus, after operation cycle 24, the first low portion 226a stores a value of 0x000045EE (where the "45" part was accumulated in the second bit range of the first low portion 226a in operation cycle 24, and the "EE" part was accumulated in the first bit range of the first low portion 226a in operation cycle 8).

A similar accumulation is performed for operation cycles for successive DPUs 202b-202h, to accumulate the lowest 8 bits of the further first storage devices 216b-216h of the second to eighth DPUs 202b-202h with carry bits 1 to 7 of the set of carry bits 230 and the second further stored data in bits 8:15 (corresponding to a second bit range) of the low portions 226b-226h of the second to eighth secondary accumulators. The lowest 8 bits of the accumulated data within each of the further first storage devices 216b-216h that are sent 220b-220h to the secondary adder 218 for accumulation with the second bit range of the low portions 226b-226h of the second to eighth secondary accumulators are 0x5F, 0x4C, 0Xff, 0Xc0, 0Xd4, 0x05 and 0x2F, respectively. Only the second bit range (8:15) of the low portions 226a-226h of the secondary accumulators 224 are updated at this stage; the first bit range (0:7) of the low portions 226a-226h was updated previously (as shown in FIG. 2a) and the high portions 228a-228h are updated subsequently (as shown in FIG. 2c).

Accumulation of the lowest eight bits of the further accumulated data of the further first storage device 216a-216h with the corresponding second further stored data in the second bit range of the low portions 226a-226h of the secondary accumulators 224 may also result in the generation of a carry, represented by carry data and stored within the set of carry bits 230 for use in further accumulations.

After the high x low and low x high dot products have been calculated as shown in FIG. 2b, the high x high dot products are calculated in a similar manner but using different bit ranges of the weights and tensors to be processed, as explained above. The calculation of the high x high dot products is shown schematically in FIG. 2c, which shows the same structural components as FIGS. 2a and 2b, but for the high x high dot product.

In FIG. 2c, during operation cycles 24 to 31, the DPUs 202a-202h perform the high x high dot product calculation, described above, so that accumulated data is stored within the first storage devices 214a-214h of each of the DPUs 202a-202h after operation cycle 31. Hence, it can be seen that the high x high dot product calculations are performed at least partly at the same time as the high x low and low x high accumulated data is accumulated within the second bit range of the secondary accumulators (which is performed during operation cycles 24 to 31, as described with reference to FIG. 2b).

In FIG. 2c, stored data remains in the first storage devices 214a-214h after the lowest 8 bits of the further accumulated data are bit-shifted out of the first storage devices 214a-214. For example, as shown in FIG. 2b, the first storage device 214a of the first DPU 202a stores stored data representing the value 0x1FFFFFB after the lowest 8 bits of the further accumulated data are bit-shifted out of the first storage device 214a. Hence, in operation cycle 24, a further set of operation data generated for the first DPU 202a by the high x high dot product calculation (i.e. by the multiplication of y bits, higher than the lowest x bits, of a first set of weights with y bits, higher than the lowest x bits, of a first set of tensor portions) is accumulated with the stored data representing the value 0x1FFFFFB. A similar accumulation is performed in operation cycle 24 for each of the other DPUs 202b-202h, in which the further set of operation data for operation cycle 24 is accumulated with the stored data remaining in the first storage device 214b-214h of that respective DPU 202b-202h, which takes a non-zero value.

In operation cycle 31, the accumulated data for a given DPU 202a-202h is written to the further first storage device 216a-216h for that DPU 202a-202h. The accumulated data in FIG. 2c may be considered third accumulated data to distinguish such data from the first and second accumulated data of FIGS. 2a and 2b. In this case, the high x high calculation represents the final part of the dot product calculation. Hence, in this case, the stored data within the first storage devices 214a-214h is right bit-shifted from the first storage devices 214a-214h to clear the first storage devices 214a-214h so they are ready to begin a new dot product calculation.

During operation cycles 32 to 39, the third accumulated data within each of the further first storage devices 216a-216h (bits 0:24 in this case, as each further first storage device 216a-216h has a size of 25 bits) is sent 220a-220h to the secondary adder 218, from one DPU 202a-202h per operation cycle. The third accumulated data is accumulated with third further stored data within the high portion of a respective secondary accumulator 224. The high portion of a given secondary accumulator 224 may thus be considered to correspond to a third bit range of that secondary accumulator. For example, during operation cycle 32, the 25 bits of the further first storage device 216a of the first DPU 202a are accumulated with carry bit 0 of the set of carry bits 230 and the third further stored data in bits 0:31 (corresponding to a third bit range) of the first high portion 228a of the first secondary accumulator. Although the bits of the low and high portions 226a-226h, 228a-228h are numbered separately (with the low portions 226a-226h having bits 0:15 and the high portions 228a-228h having bits 0:31), it is to be appreciated that the high portion of a given secondary accumulator may be considered to form a higher (i.e. more significant) bit range of the secondary accumulator as a whole than the low portion. In other words, bits 0:31 of the high portions 228a-228h may be considered to correspond to bits 16:47 of a respective secondary accumulator, viewed as whole.

In this case, the 25 bits of the further first storage device 216a of the first DPU 202a represent the value 0x0008135, which are accumulated with carry bit 0 (which is 0 in this case) and the third further stored data (which is also 0) to update bits 0:31 of the first high portion 228a to 0x00008135. A similar accumulation is performed for operation cycles for successive DPUs 202b-202h, to accumulate the 25 bits of the further first storage devices 216b-216h of the second to eighth DPUs 202b-202h with carry bits 1 to 7 of the set of carry bits 230 and the third further stored data in bits 0:31 of the high portions 228b-228h of the second to eighth secondary accumulators. The 25 bits of the third accumulated data within each of the further first storage devices 216b-216h that are sent 220b-220h to the secondary adder 218 for accumulation with the third further stored data within the high portions 228b-228h of the second to eighth secondary accumulators are 0x1FFF35AC, 0x1FFF5936, 0x0000081D, 0x1FFFD79B, 0x00009B1F, 0x00004912 and 0x00003267, respectively. Only the high portions 228a-228h of the secondary accumulators 224 are updated at this stage; the first bit range (0:7) of the low portions 226a-226h were updated previously (as shown in FIGS. 2a and 2b). The set of carry bits 230 is not updated in this case, as the completion of the dot products is complete.

It is to be appreciated that the processing shown in FIGS. 2a to 2c may be repeated a plurality of times to accumulate a plurality of results (in this case of dot product calculations) into the secondary accumulators 224. The first storage devices 214a-214h and the further first storage devices 216a-216h (which together may be considered to form primary or L1 accumulators) may be cleared to zero before the processing of FIG. 2a is performed each time.

After a desired set of results are accumulated into the secondary accumulators 224, different respective bit ranges of the secondary accumulators may be read separately, and combined together to obtain a final, 48-bit result. For example, the low portions 226a-226h (in this case corresponding to bits 0:15) at this stage may be considered to store first value data representative of a first portion of a value, which may be read from the low portions 226a-226h of the secondary accumulators 224. Second value data representing a second portion of a value, and represented by the high portions 228a-228h (in this case corresponding to bits 16:47 of each the secondary accumulators 224, viewed as a whole) may subsequently read. The first and second value data may then be combined, e.g. by concatenation, to generate value data representative of a value.

Figure 3A:
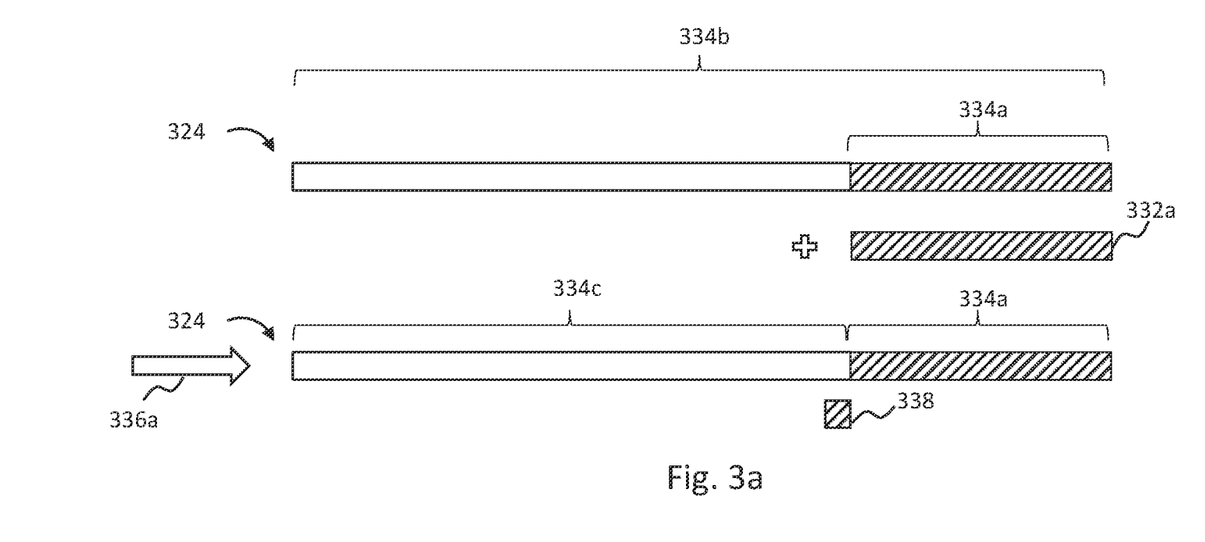
FIGS. 3a and 3b are schematic diagrams showing accumulation of data according to further examples.
Figure 3B:
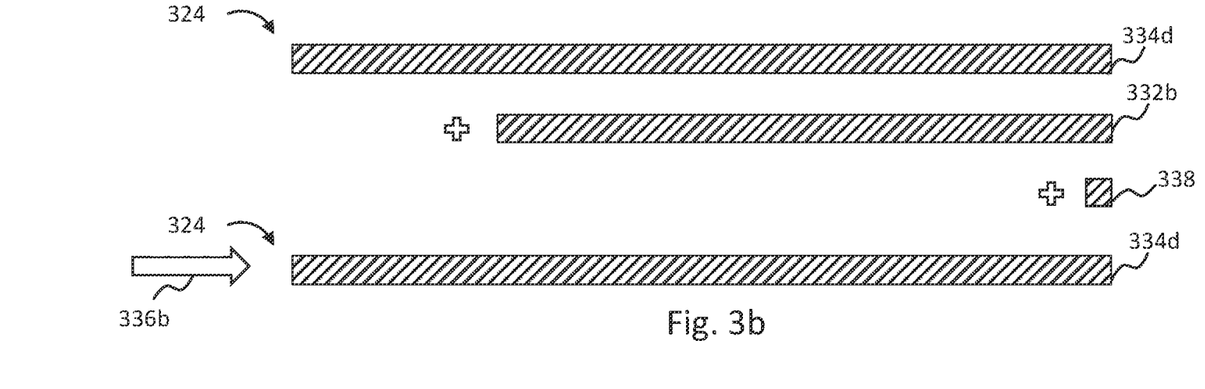

FIGS. 3a and 3b are schematic diagrams showing accumulation of data according to further examples. FIGS. 2a to 2c illustrate the division of a 16 bit by 16 bit dot product calculation into four 8 bit by 8 bit dot products and the use of 48-bit secondary accumulators 224. In contrast, in FIGS. 3a and 3b, an 8 bit by 16 bit dot product calculation is divided into two 8 bit by 8 bit dot products, and a 40-bit secondary accumulator 324 is used. FIGS. 3a and 3b show the use of a single secondary accumulator 324. However, it is to be appreciated that the methods of FIGS. 3a and 3b may equally be applied to a system including a plurality of secondary accumulators 224, such as that shown in FIGS. 2a to 2c.

In FIG. 3a, eight sets of 8-bit weights are multiplied with a first bit range (of 8 bits) of eight sets of tensor portions over eight operation cycles, using a DPU such as the DPU 102 of FIG. 1 (not shown in FIG. 3a), so as to generate a set of operation data per operation cycle, which is accumulated with stored data within a first storage device each operation cycle. After eight operation cycles, the first storage device stores accumulated data corresponding to a low accumulation term (as the first bit range is the lowest 8 bits of each tensor portion in this example).

The lowest 8 bits 332a of the first storage device (bits 0:7) are sent to an adder (such as the secondary adders 118, 218 of FIGS. 1 and 2a to 2c, not shown in FIG. 3a) to be accumulated with first further stored data within a first bit range 334a of the second storage device 324. In this case, the first further stored data is a null value, as the second storage device 324 has been cleared prior to the performance of the processing of FIG. 3a. The first bit range 334a in this case is bits 0:7, although the first bit range 334a occupies a portion of a larger bit range 334b (bits 0:31) of the second storage device 324, corresponding to the 8 least significant bits of the larger bit range 334b. The larger bit range 334b in this case corresponds to a low half (of the least significant 32 bits) of a 64-bit second storage device 324.

After this accumulation (indicated schematically in FIG. 3a with an arrow 336a), the first bit range 334a (i.e. bits 0:7) of the second storage device 324 stores the accumulation of the lowest 8 bits 332a of the first storage device and the first further stored data. The remaining portion 334c of the larger bit range 334b of the second storage device 324 remains unused. This accumulation generates carry data 338, which may be stored in a set of carry bits as described with reference to FIGS. 2a to 2c. At this stage, the lowest 8 bits of the accumulated data are right bit-shifted out of the first storage device so as to update the stored data within the first storage device.

FIG. 3b shows processing that is performed over a subsequent 8 operation cycles. In these operation cycles (operation cycles 8 to 15), eight sets of 8-bit weights are multiplied with a second bit range (of 8 bits subsequent to the lowest 8 bits processed as shown in FIG. 3a) of eight sets of tensor portions, using a DPU such as the DPU 102 of FIG. 1 (not shown in FIG. 3a), so as to generate a set of operation data per operation cycle, which is accumulated with the stored data within the first storage device each operation cycle. As explained above, the stored data within the first storage device was updated after the accumulation of the accumulated data within bits 0:7 of the first storage device with the first further stored data within bits 0:7 of the second storage device, to right bit-shift 8 bits from the first storage device. Thus, the set of operation data for the eighth operation cycle may be accumulated with non-zero stored data within the first storage device, in contrast to the accumulation performed in operation cycle 0, at which time the first storage device is clear. After operation cycles 8:15, the first storage device stores further accumulated data corresponding to a high accumulation term in FIG. 3b (as the second bit range is the highest 8 bits of each tensor portion in this example).

The first storage device in the example of FIGS. 3a and 3b has a size of 25 bits. In this case, after operation cycles 8 to 15, the lowest 25 bits 332b of the further accumulated data within the first storage device (i.e. bits 0:24 of the first storage device, corresponding to the whole first storage device) are sent to an adder (such as the secondary adders 118, 218 of FIGS. 1 and 2a to 2c, not shown in FIG. 3b) to be accumulated with second further stored data within a second bit range 334d of the second storage device 324 and with the carry 338 obtained as shown in FIG. 3a. In this case, the second further stored data is a null value, as the second storage device 324 was cleared prior to the performance of the processing of FIG. 3a, and the second bit range 334d of the second storage device 324 was not updated by the processing of FIG. 3*a*. The second bit range 334*b* in this case is bits 8:39, which is stored in bits 32:63 of the second storage device 324 (where bits 32:63 correspond to the most significant 32 bits of the 64-bit second storage device 324).

After this accumulation (indicated schematically in FIG. 3*b* with an arrow 336*b*), the second bit range 334*b* of the second storage device 324 stores the accumulation of the 25 bits sign extended to 32 bits of the first storage device, the second further stored data and the carry. No carry data is generated at this stage, as the calculation of the dot product is complete.

To obtain the value of the dot product calculation as a whole, bits 0:7 stored in the low 32 bits of the second storage device may be concatenated with bits 8:39 stored in the high 32 bits of the second storage device 324 to obtain value data representative of the value. These two bit ranges of the second storage device 324 (e.g. corresponding to a bit range and a further bit range, respectively) may be read at a different time from each other, so as to reduce bandwidth at a given time.

Figure 4:
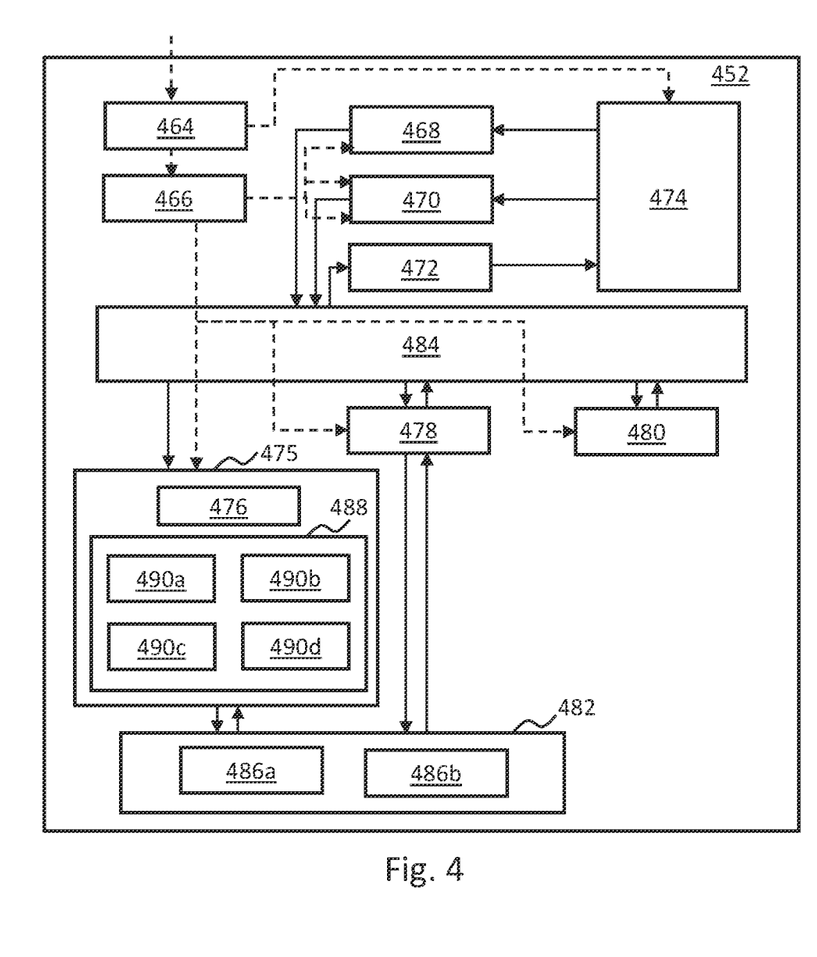
FIG. 4 is a schematic diagram of a neural engine, according to examples.

An example of a processor which may include the DPUs 102, 202*a*-202*h* of FIGS. 1 and 2*a* to 2*c*, and which may be configured to perform any of the processing described herein is a neural engine 452, which is shown schematically in FIG. 4. The neural engine 452 includes a command and control module 464. The command and control module 464 for example receives tasks from a command processing unit external to the neural engine 452. Such tasks may be neural processing tasks, involving the implementation of at least part of a neural network, which may include the performance of multiply-accumulate operations to calculate dot products between neural network weights and tensor portions representing respective portions of input feature maps. The command and control module 464 also acts as an interface to storage external to the neural engine 452 (such as a local cache of a data processing system comprising the neural engine 452 and/or a L2 cache). Storage such as this may store data to be processed by the neural engine 452 such as data representing a tensor or a stripe of a tensor, or data representing neural network weights. The storage may additionally store other data to configure the neural engine 452 to perform particular processing.

The command and control module 464 interfaces to a handling unit 466, which is for example a traversal synchronization unit (TSU). In one example, each task corresponds to a stripe of a tensor, which is to be convolved with weights to implement a layer of a neural network. In this example, the handling unit 466 splits data representing a stripe of a tensor into a plurality of blocks of data, each of which represents a respective part of the tensor (referred to above as tensor data). The handling unit 466 also coordinates the interaction of internal components of the neural engine 452, which include a weight fetch unit 468, an input reader 470, an output writer 472, a direct memory access (DMA) unit 474, a convolution engine 475 (which includes a dot product unit (DPU) array 476), a vector engine 478, a transform unit 480, an accumulator buffer 482, and storage 484. The data dependencies across the functional units are tracked by the handling unit 466. Processing is initiated by the handling unit 466 in a functional unit if all inputs are available and space is available in the storage 484 of the neural engine 452. The storage 484 may be considered to be a shared buffer, in that various functional units of the neural engine 452 share access to the storage 484.

The input reader 470 reads data to be processed by the neural engine 452 from external storage, such weight data and tensor data as discussed above. The output writer 472 writes output data obtained after processing by the neural engine 452 to external storage, such as output data representing at least part of an output feature map obtained by processing a corresponding at least part of an input feature map by the neural network represented by the weights fetched by the weight fetch unit 468. The weight fetch unit 468, input reader 470 and output writer 472 interface with the external storage (such as a local cache, which may be an L1 cache such as a load/store cache, and/or an L2 cache) via the DMA unit 474.

The weight and tensor data are processed by the DPU array 476 of the convolution engine 475, the vector engine 478 and the transform unit 480 to generate output data which is written out to the external storage by the output writer 472. The DPU array 476 is arranged to efficiently calculate a dot product between two operands, such as between an array of weights and a corresponding block of data (e.g. representing part of a tensor), and for example includes a plurality of DPUs such as a plurality of the DPU 102 of FIG. 1, or the DPUs 202*a*-202*h* shown in FIGS. 2*a* to 2*c*. The vector engine 478 is arranged to perform elementwise operations, for example to apply scale parameters to perform precision scaling an output of a dot product calculated by the DPU array 476, to add a bias to the output of the DPU array 476 and so forth. Data generated during the course of the processing performed by the DPU array 476 and the vector engine 478 is stored temporarily in the accumulator buffer 482, from where it may be retrieved by either the DPU array 476 or the vector engine 478 for further processing as desired.

In this example, the DPU array 476 includes L1 accumulators such as the first storage devices 114, 214*a*-214*h* discussed above. The accumulator buffer 482 includes L2 accumulators such as the L2 accumulators 224, 324 discussed above. In this case, the accumulator buffer 482 is a dedicated buffer comprising a plurality of SRAM banks comprising the L2 accumulators (which are examples of second storage devices). FIG. 4 shows a first bank 486*a* and a second bank 486*b* of the accumulator buffer, although it is to be appreciated that, in this example, the accumulator buffer 482 actually includes 16 banks. However, in one example of a neural engine 452, there are 16 128-high, 128-wide 1RW SRAM banks, providing 32 kilobytes (kB) of storage in total. A 1RW SRAM bank is a single ported SRAM bank, meaning that, each operation cycle, the port can either be used for a read or for a write (but not both at the same time). The SRAM banks in this example may be divided into two logical buffers of 2,000 40-bit or 48-bit L2 accumulators such as those shown in FIGS. 2*a* to 2*c* and FIG. 3. By dividing the SRAM banks into two logical buffers, the 8 banks of one of the buffers can be read and written to by the DPU array 476, while the 8 banks of the other buffer are read by the vector engine 478, for example to do bias addition and precision scaling. For example, banks 0:7 may be allocated to logical buffer 0, and banks 8:15 may be allocated to logical buffer 1.

In this example, the second storage devices (which in this case are L2 accumulators) include two 32-bit halves which are stored in two different accumulator buffer SRAM words within the same bank. Each half of the second storage device for example corresponds to a different respective bit range of the second storage device, which may be accessed separately. In this way, up to 32 bits of data bandwidth is used per L2 accumulator access (for a respective half of a given L2 accumulator), compared to a 64 bit bandwidth for accessing the full L2 accumulator at each accumulation step.

In one example, each microblock of 128 L2 accumulators is stored in 8 sequential addresses in SRAM. In one example with a 2×2×32 microblock, the SRAM comprises 128-bit words and 8 banks. Words at address 0 hold accumulator bits 0:15 (corresponding to a first bit range of a second storage device) in a 32-bit container for four (y, x, c) tensor positions (0, 0, 0), (0, 1, 0), (0, 0, 4), (0, 1, 4), where y, x, and c represent y, x and channel co-ordinates of a tensor portion processed to obtain data which is accumulated within the L2 accumulators within the SRAM. Words at address 4 hold accumulator bits 16:47 (for a 48-bit second storage device, corresponding to a second bit range of the second storage device) stored in a 32-bit container for four (y, x, c) tensor positions (0, 0, 0), (0, 1, 0), (0, 0, 4), (0, 1, 4). In this case, an address offset of 1 to 3 adds 8 to the channel number. A bank offset addition of 1 to 3 adds this offset to the channel number. A bank offset addition of 4 adds 1 to the y co-ordinate.

The convolution engine 475 also includes an adder array 488, which may be similar to or the same as the secondary adder 218 of FIGS. 2a to 2c. The adder array 488 is split into four quarter size units, referred to as quarter adder arrays (QAAs) 490a-490d. Each QAA 490a-490d is connected to four accumulator buffer 482 SRAM banks. While a given QAA 490a-490d updates the L2 accumulators in logical buffer zero (banks 0 to 7) for a current block, the vector engine 478 reads final accumulations from logical buffer zero (banks 8 to 15). Each QAA 490a-490d processes either even or odd output feature maps (OFMs) in this example. In this case, $QAA_0$ 490a processes OFM %4=0, i.e. OFMs 0, 4, 8, 12 etc. $QAA_1$ 490b processes OFM %4=1, i.e. OFMs 1, 5, 9, 13 etc. $QAA_2$ 490c processes OFM %4=2, i.e. OFMs 2, 6, 10, 14. $QAA_3$ 490d processes OFM %4=3, i.e. OFMs 3, 7, 11, 15 etc.

Each QAA 490a-490d has a left pair and a right pair of 32-bit adders. Each pair reads one 128-bit word from one SRAM bank in even cycles and writes 128 bits of adder output in odd cycles. Each 128-bit word contains either the low or high 32 bits of 4 output elements (where the low and high 32 bits correspond to a bit range and a further bit range of a second storage device). Four 40- or 48-bit L2 accumulators (which are examples of second storage devices) occupy two accumulator buffer words, effectively using 64 bits of storage per L2 accumulator.

For 8×8 MACs, each QAA 490a-490d processes the output of four DPUs of the DPU array 476 per operation cycle to update four 32-bit L2 accumulators of the accumulator buffer 482. Collectively, the four QAAs 490a-490d process the output of 128 DPUs every 8 operation cycles. Each adder pair processes four DPU outputs every 2 operation cycles. In the first operation cycle, a 128-bit word is read from the accumulator buffer 482 SRAM bank and the L2 accumulators for the x %2=0 elements are updated. In the second operation cycle, the L2 accumulators for the x %2=1 elements are updated and the 128-bit word is written.

The transform unit 480 is arranged to perform in-block transforms such as dimension broadcasts or axis swaps. The transform unit 480 obtains data from the storage 484 (e.g. after processing by the DPU array 476 and/or vector engine 478) and writes transformed data back to the storage 484.

The above examples are to be understood as illustrative examples. Further examples are envisaged. Although examples above are described with reference to processing of data to implement a neural network, it is to be appreciated that these examples are merely illustrative, and the methods herein may be used in the processing of data of various types and/or in the performance of various other types of processing, different from neural network processing. Examples above refer to the accumulation of data. It is to be appreciated that the accumulation of data may refer to the accumulation of data to implement integer accumulation, or other forms of accumulation such as accumulation of polynomials over a finite field, e.g. the accumulation of polynomials over the field GF(2) of two elements 0, 1.

Examples above include specific bit ranges for the purposes of illustration only. It is to be appreciated that bit ranges (e.g. first, second and third bit ranges) may differ from those described above in other examples.

Examples above involve the processing of first and second input data in the implementation of a neural network. However, in other examples, the approaches herein may equally be applied to other processing with a single operand (or a single type of operand) such as at least one set of first input data. In such cases, an operation may be performed on a first bit range of the at least one set of first input data for a corresponding at least one operation cycle to generate a set of operation data, which may be otherwise treated in the same way as the set of operation data in the examples above with two operands. Similarly, the operation may then be performed on a second bit range of the at least one set of first input data for a corresponding at least one operation cycle to generate a set of further operation data, which again may be treated in the same way as the set of further operation data in the examples above with two operands. Example operations with a single operand that may be performed using the techniques herein are for example complex operations such as calculation of a reciprocal, exponential or logarithm of an input value. The approaches herein can for example be used to build up a relatively high precision result through an accumulation scheme involving moving from lower order to higher order bits of the result.

Furthermore, it is to be appreciated that, in yet further examples, there may be more than two operands. In such cases, one or more of the operands may be divided into a plurality of bit ranges, and processed in a similar manner to that of two operands, but accounting for all the combinations of bit ranges and operands.

FIGS. 2a to 2c illustrate the example of a 48-bit second storage device. In this example, the DPUs 202a-202h each include two L1 accumulators (the first storage devices 214a-214h and the further first storage devices 216a-216h). However, in other examples, data accumulation using an 48-bit second storage device may be implemented using a single L1 accumulator (such as solely the first storage devices 214a-214h) in an analogous manner to that described for the 40-bit second storage device example of FIGS. 3a and 3b, in which the accumulated data is sent from the first storage devices 214a-214h to the L2 accumulators 224 rather than from further first storage devices 216a-216h. Conversely, data accumulation using a 40-bit second storage device may be performed using two L1 accumulators, in an analogous manner to that described with reference to FIGS. 2a to 2c. Furthermore, while examples above utilize 40-bit or 48-bit second storage devices, in other examples, a second storage device may have a different size than this and may be divided into different bit ranges than those described in the examples above.

It to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A processor to:
 obtain at least one set of first input data;
 divide each of the at least one set of first input data into at least a first bit range and a second bit range, higher than the first bit range;
 generate accumulated data, wherein to generate the accumulated data comprises, for each operation cycle of at least one operation cycle:
  performing an operation on the first bit range of a respective set of the at least one set of first input data to generate a set of operation data; and
  accumulating the set of operation data with stored data within a first storage device;
 accumulate a lowest n bits of the accumulated data with first further stored data within a first storage bit range of a second storage device;
 bit-shift the lowest n bits of the accumulated data from the first storage device, thereby updating the stored data within the first storage device;
 generate further accumulated data, wherein to generate the further accumulated data comprises, for each operation cycle of a further at least one operation cycle after the at least one operation cycle:
  performing the operation on the second bit range of a respective set of the at least one set of first input data to generate a further set of operation data; and
  accumulating the further set of operation data with the stored data within the first storage device; and
 accumulate a lowest m bits of the further accumulated data with second further stored data within a second storage bit range of the second storage device, higher than the first storage bit range of the second storage device.

2. The processor of claim 1, wherein:
 the at least one set of first input data is a plurality of sets of first input data, the at least one operation cycle is a plurality of operation cycles, and the further at least one operation cycle is a further plurality of operation cycles;
 to generate the accumulated data comprises, for each operation cycle of the plurality of operation cycles:
  performing an operation on the first bit range of a respective set of the plurality of sets of first input data to generate a set of operation data; and
  accumulating the set of operation data with stored data within a first storage device; and
 to generate the further accumulated data comprises, for each operation cycle of the further plurality of operation cycles:
  performing the operation on the second bit range of a respective set of the plurality of sets of first input data to generate a further set of operation data; and
  accumulating the further set of operation data with the stored data within the first storage device.

3. The processor of claim 1, wherein:
 the performing the operation on the first bit range of the respective set of the at least one set of first input data, for each operation cycle of the at least one operation cycle, comprises, for each operation cycle of the at least one operation cycle:
  multiplying the first bit range of the respective set of the at least one set of first input data with a bit range of a respective set of at least one set of second input data to generate the set of operation data; and
 the performing the operation on the second bit range of the respective set of the at least one set of first input data, for each operation cycle of the further at least one operation cycle, comprises, for each operation cycle of the further at least one operation cycle:
  multiplying the second bit range of the respective set of the at least one set of first input data with the bit range or a further bit range of a respective set of the at least one set of second input data to generate the further set of operation data.

4. The processor of claim 3, wherein, to accumulate the lowest n bits of the accumulated data with the first further stored data generates a carry represented by carry data, and, to accumulate the lowest m bits of the further accumulated data with the second further stored data comprises accumulating the lowest m bits of the further accumulated data with the second further stored data and the carry data within the second storage bit range of the second storage device.

5. The processor of claim 3, wherein each of the at least one set of first input data comprises a respective set of neural network weight data and each of the at least one set of second input data comprises a respective set of tensor data representative of at least a part of a multi-dimensional tensor.

6. The processor of claim 1, wherein, after accumulation of the lowest m bits of the further accumulated data with the second further stored data, a storage bit range of the second storage device stores first value data representing a first portion of a value and a further storage bit range of the second storage device, higher than the storage bit range of the second storage device, stores second value data representing a second portion of the value.

7. The processor of claim 6, wherein the processor is to:
 read the first value data from the storage bit range of the second storage device at a first time;
 read the second value data from the further storage bit range of the second storage device at a second time, different from the first time; and
 combine at least the first value data and the second value data to generated value data representative of the value.

8. The processor of claim 6, wherein the first value data is comprised by a first word in the storage bit range of the second storage device and the second value data is comprised by a second word, different from the first word, in the further storage bit range of the second storage device.

9. The processor of claim 1, wherein:
 the accumulating the set of operation data with the stored data within the first storage device comprises accumulating the set of operation data with the stored data within a first series of bits of the first storage device; and
 the accumulating the further set of operation data with the stored data within the first storage device comprises accumulating the further set of operation data with the stored data within a second series of bits of the first storage device, the second series of bits comprising, and being larger than, the first series of bits.

10. The processor of claim 1, wherein the first storage device is a first accumulator and the second storage device is a second accumulator.

11. The processor of claim 1, wherein the first storage device has a higher bandwidth than the second storage device.

12. The processor of claim 1, wherein the accumulated data and the further accumulated data are each generated over P operation cycles, with the P operation cycles for generating the further accumulated data occurring subsequently to the P operation cycles for generating the accumulated data.

13. The processor of claim 1, wherein the processor is to:
store the accumulated data in a further first storage device; and,
to accumulate the lowest n bits of the accumulated data with the first further stored data, send the lowest n bits of the accumulated data from the further first storage device to the second storage device for accumulation with the first further stored data within the first storage bit range of a second storage device.

14. The processor of claim 13, wherein the processor is to:
store the further accumulated data in the further first storage device; and,
to accumulate the lowest m bits of the further accumulated data with the second further stored data, send the lowest m bits of the further accumulated data from the further first storage device to the second storage device for accumulation with the second further stored data within the second storage bit range of a second storage device.

15. The processor of claim 1, wherein m is greater than n and the second storage bit range of the second storage device is larger than the first storage bit range of the second storage device.

16. A method comprising:
obtaining at least one set of first input data;
dividing each of the at least one set of first input data into at least a first bit range and a second bit range, higher than the first bit range;
generating accumulated data, wherein the generating the accumulated data comprises, for each operation cycle of at least one operation cycle:
  performing an operation on the first bit range of a respective set of the at least one set of first input data to generate a set of operation data; and
  accumulating the set of operation data with stored data within a first storage device;
accumulating a lowest n bits of the accumulated data with first further stored data within a first storage bit range of a second storage device;
bit-shifting the lowest n bits of the accumulated data from the first storage device, thereby updating the stored data within the first storage device;
generating further accumulated data, wherein the generating the further accumulated data comprises, for each operation cycle of a further at least one operation cycle after the at least one operation cycle:
  performing the operation on the second bit range of a respective set of the at least one set of first input data to generate a further set of operation data; and
  accumulating the further set of operation data with the stored data within the first storage device; and
accumulating a lowest m bits of the further accumulated data with second further stored data within a second storage bit range of the second storage device, higher than the first storage bit range of the second storage device.

17. The method of claim 16, wherein:
the performing the operation on the first bit range of the respective set of the at least one set of first input data, for each operation cycle of the at least one operation cycle comprises, for each operation cycle of the at least one operation cycle:
  multiplying the first bit range of the respective set of the at least one set of first input data with a bit range of a respective set of at least one set of second input data to generate the set of operation data; and
the performing the operation on the second bit range of the respective set of the at least one set of first input data, for each operation cycle of the further at least one operation cycle comprises, for each operation cycle of the further at least one operation cycle:
  multiplying the second bit range of the respective set of the at least one set of first input data with the bit range or a further bit range of a respective set of the at least one set of second input data to generate the further set of operation data.

18. The method of claim 17, wherein, the accumulating the lowest n bits of the accumulated data with the first further stored data generates a carry represented by carry data, and, the accumulating the lowest m bits of the further accumulated data with the second further stored data comprises accumulating the lowest m bits of the second accumulated data with the second further stored data and the carry data within the second storage bit range of the second storage device.

19. The method of claim 17, wherein each of the at least one set of first input data comprises a respective set of neural network weight data and each of the at least one set of second input data comprises a respective set of tensor data representative of at least a part of a multi-dimensional tensor.

20. A non-transitory computer-readable storage medium comprising a set of computer-readable instructions stored thereon which, when executed by at least one processor, are arranged to cause the at least one processor to:
obtain at least one set of first input data;
divide each of the at least one set of first input data into at least a first bit range and a second bit range, higher than the first bit range;
generate accumulated data, wherein to generate the accumulated data comprises, for each operation cycle of at least one operation cycle:
  performing an operation on the first bit range of a respective set of the at least one set of first input data to generate a set of operation data; and
  accumulating the set of operation data with stored data within a first storage device;
accumulate a lowest n bits of the accumulated data with first further stored data within a first storage bit range of a second storage device;
bit-shift the lowest n bits of the accumulated data from the first storage device, thereby updating the stored data within the first storage device;
generate further accumulated data, wherein to generate the further accumulated data comprises, for each operation cycle of a further at least one operation cycle after the at least one operation cycle:
  performing the operation on the second bit range of a respective set of the at least one set of first input data to generate a further set of operation data; and
  accumulating the further set of operation data with the stored data within the first storage device; and
accumulate a lowest m bits of the further accumulated data with second further stored data within a second storage bit range of the second storage device, higher than the first storage bit range of the second storage device.

* * * * *